Dec. 18, 1962 — E. M. ALLEN — 3,069,282
PROCESS FOR PRODUCING PIGMENTS
Filed March 9, 1960 — 5 Sheets-Sheet 1

INVENTOR.
EDWARD M. ALLEN
BY Oscar H. Spencer
ATTORNEY

Dec. 18, 1962 E. M. ALLEN 3,069,282
PROCESS FOR PRODUCING PIGMENTS
Filed March 9, 1960 5 Sheets-Sheet 2

INVENTOR.
EDWARD M. ALLEN
BY
Oscar L. Spencer
ATTORNEY

Dec. 18, 1962  E. M. ALLEN  3,069,282
PROCESS FOR PRODUCING PIGMENTS
Filed March 9, 1960  5 Sheets-Sheet 4

INVENTOR.
EDWARD M. ALLEN
BY
Oscar L Spencer
ATTORNEY

United States Patent Office 3,069,282
Patented Dec. 18, 1962

3,069,282
PROCESS FOR PRODUCING PIGMENTS
Edward M. Allen, Doylestown, Ohio, assignor, by mesne assignments, to Pittsburgh Plate Glass Company
Filed Mar. 9, 1960, Ser. No. 13,860
10 Claims. (Cl. 106—300)

The present invention relates to the preparation of titanium dioxide and more particularly to the vapor phase oxidation of titanium tetrachloride to produce an improved titanium dioxide pigment.

According to the present invention, a well dispersed titanium dioxide pigment of high quality is prepared having improved tinting strength, hiding power and other enhanced properties which make it extremely desirable for use as a pigment in rubber, paper, and paint, and for many other uses.

The applicant hereby makes specific reference under the provisions of 35 USC 120, to the copending earlier filed applications Serial No. 844,077, filed October 2, 1959, and Serial No. 857,850, filed December 7, 1959, in which earlier filed applications there is disclosed an invention disclosed in the present application Serial No. 13,860, filed March 9, 1960.

The present invention is directed to a novel method of producing cheap pigmentary titanium dioxide having an enhanced tinting strength by contacting titanium tetrachloride with the hot products of combustion produced by burning an ignitible mixture of a carbonaceous material suspended in a gas containing oxygen in excess of that required to react with the carbonaceous fuel.

According to one embodiment of the present invention, a process for producing pigmentary titanium dioxide has been discovered which comprises establishing separate, but communicating first and second gas space reaction zones, forming outside said zones an ignitible mixture of solid, particulate, carbonaceous material suspended in an oxygen-containing gas, projecting the ignitible mixture into the first reaction zone and igniting it therein to produce a hot combustion gas, flowing a stream comprising titanium tetrachloride in said second zone, and passing the hot combustion gas into the flowing stream of titanium tetrachloride to cause thermal decomposition of titanium tetrachloride and to form a hot mixture of titanium dioxide suspended in resulting reaction gases.

In carrying out the present invention, the hot products of combustion produced by burning the ignitible mixture are preferably introduced into the second zone from a plurality of points at the periphery of the second zone which surround the flowing titanium tetrachloride stream and which are in communication with the first zone.

In a preferred embodiment of the present invention, sufficient oxygen is introduced into the first reaction zone, (hereinafter referred to as the combustion zone) to both exhaustively oxidize the carbonaceous material and to react with the quantity of titanium tetrachloride fed to the second zone. This results in an oxygen content of the ignitible mixture fed to the combustion zone which is substantially in excess of that required to oxidize the carbonaceous material. The excess oxygen in the ignitible mixtures produces many advantages, as will hereinafter be brought out. If desired, a separate stream of air or oxygen may also be fed to the combustion chamber to further increase the oxygen content of the combustion gas.

The molar ratio of oxygen in the ignitible mixture to the molar sum of carbonaceous material in the ignitible mixture and the titanium tetrachloride fed to the second zone may vary between about 1:1 and 5:1, and is preferably between 1.1:1 and 2:1. The molar ratio of oxygen in the ignitible mixture to the carbon content of the mixture is preferably in excess of 2:1 and may be as high as 20:1.

Of course, if desired, oxygen may also be introduced into the second zone (hereinafter referred to as the reaction zone), with the titanium tetrachloride. In this event, the oxygen content of the ignitible mixture fed to the combustion zone may be reduced by the quantity of oxygen introduced with the titanium tetrachloride.

Employing the ignitible mixture to supply all the oxygen required for reaction with the titanium tetrachloride has the advantage of eliminating the necessity of preheating the oxygen stream, inasmuch as the excess oxygen present in the ignitible mixture is heated to the combustion gas temperature when the ignitible mixture is burned in the combustion zone. Further, because the temperature of the combustion gas, and consequently that of the oxygen therein, is considerably above that at which titanium tetrachloride reacts with oxygen, the preheat temperature of the titanium tetrachloride fed to the reaction zone need not be as high as would ordinarily be required. In other words, the present process contemplates running with lower titanium tetrachloride preheat than has heretofore been possible. An explanation of this phenomenon follows:

In carrying out the vapor phase oxidation of titanium tetrachloride, the reactants, i.e., titanium tetrachloride and oxygen, must be at a temperature high enough to cause the reaction to occur. The temperature of reaction required to produce satisfactory products for use as a pigment is generally considered to be between about 900° F. and 2700° F., and preferably between about 1400° F. and 2200° F. To produce the necessary reaction temperature, however, it has been discovered that both reactants need not be heated to the above described temperature ranges. Thus, one of the reactants may be above reaction temperature and the other below reaction temperature, assuming of course that the total heat content of the two streams is high enough to cause the reaction to occur. Heat capacity consideration predict that for every 100° C. in oxygen preheat, above reaction temperature, a 40° C. reduction can be made in titanium tetrachloride preheat. Accordingly, because in the present invention the oxygen fed to the reaction zone has a very high temperature, i.e., the temperature of the combustion gas, the temperature of the titanium tetrachloride introduced into the reaction space can be relatively low, thereby eliminating costly equipment ordinarily necessary to impart a high preheat to the titanium tetrachloride feed. Further, operation with relatively low temperature $TiCl_4$ has been found to enhance the pigmentary properties of the product produced.

Care must be exercised in preparing the ignitible mixture to insure stable combustion and to avoid hazardous conditions. The density of the solid carbonaceous material in the ignitible mixture may vary from about 0.5 to about 15 grams of carbonaceous material per cubic foot of the mixture and is preferably between about 1 and 8 grams per cubic foot, measured at standard conditions of temperature and pressure, i.e., 0° C. and 760 mm. Hg.

The temperature of the combustion gas produced when the ignitible mixture is burned in the combustion zone is capable of some variation. Thus, the temperature of the hot combustion gases produced may vary between about 1800° F. and 7200° F., or higher, depending upon the type of fuel employed and the composition of the ignitible mixture.

The types of solid carbonaceous fuels contemplated for use in the present invention must have a low hydrogen content. Use of materials having a high hydrogen content leads to formation of water vapor upon combustion of the solid fuel. The hydrogen content of the fuel, it has been discovered, should be less than about 5 percent, and preferably less than about 3 percent by weight of the fuel. The solid fuels contemplated for use in the present invention include carbon black, coke, petroleum coke, gas coke, charcoal, anthracite and bituminous coal, and other solid carbonaceous materials. The type of solid carbonaceous material employed must be capable of producing a readily ignitible mixture with air or other oxygen containing gases. Further, although the description is directed to the use of solid carbonaceous fuels, other solid materials such as sulfur, naphthalene, and so forth, which form an ignitible suspension with oxygen, may also be used.

The quantity of ignitible mixture fed to the combustion zone should be sufficient to produce a quantity of hot combustion gases, which, when introduced into the reaction zone, will insure a temperature in the reaction zone in excess of 900° F., or between 900° F. and 2700° F., and preferably between about 1400° F. and 2200° F.

In preparing the ignitible mixture, it has been found especially advantageous to employ a mixture of air and oxygen as the suspending medium. Air alone, or oxygen alone, may also be used, however. When both air and oxygen gas are used to prepare the ignitible mixture, it has been discovered that good regulation of the temperature within the titanium tetrachloride reaction zone may readily be achieved by regulating the amount of oxygen gas added to the ignitible mixture. Heretofore, such temperature control, which is important from the standpoint of the type and size of particles produced, has proved extremely difficult, if not impossible to achieve.

According to another embodiment of the present invention, it has been found highly advantageous to mix solid aluminum metal with the solid carbonaceous material in the ignitible mixture. When the resulting mixture is ignited, the carbonaceous material and the aluminum metal are co-burned, the aluminum forming extremely fine particles of $Al_2O_3$ which approach a colloidal size of less than about 0.1 millimicron. These $Al_2O_3$ particles are suspended in the combustion gases and are projected into the reaction zone therewith.

The aluminum may be added to the ignitible mixture as a powder, in the form of small slugs, or in any other way. Further, the aluminum may be mixed with the carbonaceous material prior to formation of the ignitible mixture, if desired. The quantity of aluminum added may vary between about 1 and 10 mole percent, and preferably between about 1 and 5 mole percent, based upon the quantity of titanium tetrachloride reacted. On a mole basis, the percentage of aluminum to carbon in the ignitible mixture may vary between about 2 and 20 percent, and preferably between 2 and 10 percent.

When aluminum is added to the ignitible mixture, the oxygen content thereof is correspondingly increased to provide for the oxygen requirements of the aluminum.

Besides the metal, the aluminum may be added to the carbonaceous material or to the ignitible mixture as an organic or inorganic salt of aluminum. Typical of such organic salts are aluminum acetate, aluminum ethoxide, the diethyl malonate derivative of aluminum $(Al(C_7H_{11}O_4)_3)$ aluminum isopropoxide, aluminum oleate, aluminum oxalate, aluminum salicylate, and aluminum stearate. Among the inorganic salts of aluminum that may be mentioned are the salts of the halogen acids, nitric acid, and sulfuric acid. Aluminum carbide may also be employed.

The invention will be more fully understood from the drawings, which are merely illustrative and not intended to limit the scope of the discovery in any way.

Figures 1, 2:
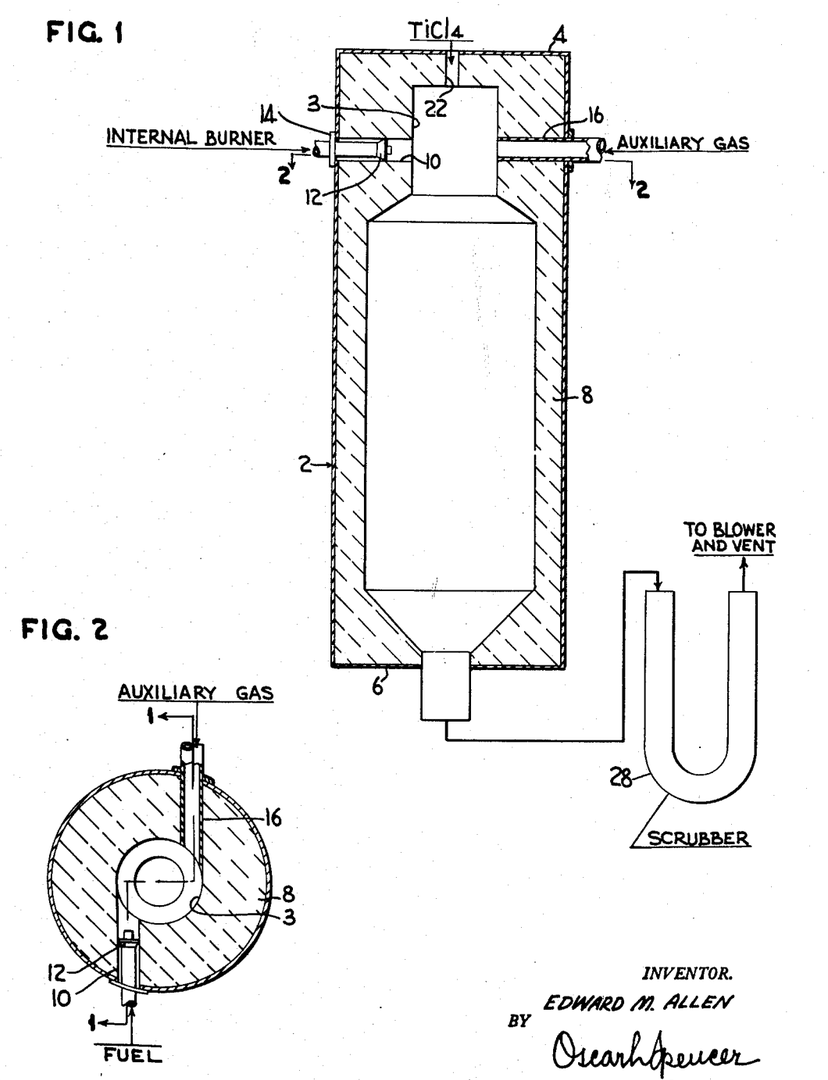
FIGURE 1 is a vertical cross-sectional view of a furnace equipped with an internal burner used to carry out the titanium tetrachloride vapor phase oxidation reaction.
FIGURE 2 is a horizontal cross-sectional view of the furnace shown in FIGURE 1 taken along the line 2—2.
Figures 3, 4, 5:
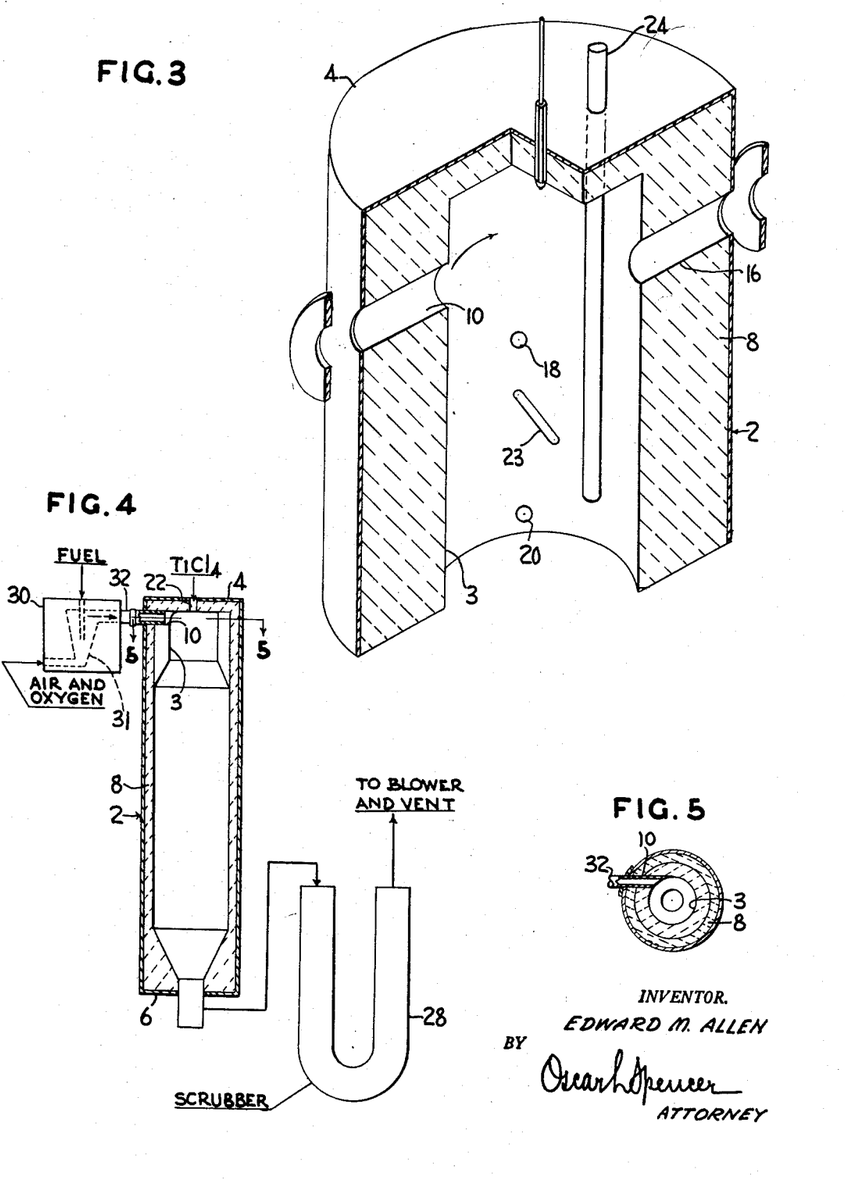
FIGURE 3 is a cut-away view of the top section of the furnace shown in FIGURE 1.
FIGURE 4 is a vertical cross-sectional view of the furnace shown in FIGURE 1 equipped with an external burner.
FIGURE 5 is a horizontal cross-sectional view of the furnace of FIGURE 4 taken along the lines 5—5.

Referring to FIGURES 1, 2 and 3, there is shown a vertical reactor 2 which may be used in carrying out the vapor phase oxidation reaction and which consists of an elongated steel column having a cover 4 and a floor 6. The reactor is lined with fire brick as indicated at 8. Reactor 2 is provided near the top with a tangential port 10 adapted to receive an internal gas burner 12.

Burner 12 is mounted on face plate 14 in tangential port 10. Various burner or burner combustions can be used in carrying out the process. Examples of burners which may be used are those manufactured by Selas Corporation of America, Dresher, Pennsylvania, under the trademarks "Duradiant" and "Refrak."

Tangential port 10 terminates at the inner surface 3 of the top of the reactor as shown in FIGURES 2 and 3. Burning fuel produced by internal burner 12 enters the furnace in a direction tangential to wall 3 and spirals around this wall at the top of the furnace.

Also disposed near the top of the reactor 2 are tangential ports 16, 18 and 20 (see FIGURE 3) through which the auxiliary gas is introduced, as will be more fully described hereinbelow. Ports 16, 18 and 20 terminate at the inside surface of the reactor as shown. The auxiliary gas enters the reactor through these ports and flows tangentially to inner wall 3 to create a spiralling stream of auxiliary gas within the top part of furnace 2. The spiralling stream of auxiliary gas is preferably out of phase with the spiralling stream of burning fuel.

The quantity of auxiliary gas introduced into the furnace may vary between about 10 percent to 95 percent by volume of the gases withdrawn from the reactor.

Centrally disposed in cover 4 of reactor 2 is a port 22 for entry of the titanium tetrachloride feed. A thermowell 24 also extends through furnace top 4 into the interior of the reactor and contains thermocouples leading to automatic temperature recording devices (not shown). Additional thermocouples may be inserted in the reactor, as is indicated at 23.

A hot gaseous suspension of $TiO_2$ is withdrawn from the bottom of the reactor as indicated by the arrow and fed into a scrubber 28 to remove the chlorine and $TiO_2$. The gases leaving the scrubber are exhausted to the atmosphere, as shown. The recovery of the formed titanium dioxide pigment forms no part of the present invention, and the type of recovery disclosed is merely illustrative of one of many types which may be employed.

The embodiment shown in FIGURE 4 differs from that shown in FIGURE 1 in that the internal burner 12 is replaced by an external burner 30. Burner 30 may be any type of commercially available fuel burners which produce gaseous combustion products. One such burner, as shown in FIGURE 3, is a cyclone burner.

Fuel is fed into the cyclone burner 30 at the top and oxidants at the bottom. The streams mix at a point about ⅓ of the distance from the bottom of the burner, and the combustion product gases emerge toward the top of the burner, combustion occurring while the gaseous mixture rises through the volute 31.

The combustion gases from burner 30 are fed through insulated pipe 32 into tangential port 10. Port 10, as indicated hereinabove, terminates flush with inner wall 3, so that the combustion gases flow into the furnace tangentially to the inner wall at the top of the reactor.

In carrying out an embodiment of the process disclosed in U.S. application Serial No. 844,077 in the apparatus shown in FIGURES 1, 2 and 3, a mixture of fuel and oxygen are charged into internal burner 12, and the mixture is ignited. The rate of fuel fed to burner 12 is regulated so that the burning fuel escapes from lateral port 10 and flows into the reactor furnace 2 tangentially to the inside wall 3 in the direction indicated by the arrow 10 (FIGURE 3). By regulating the feed, the annular spiralling stream of burning fuel may be produced having an outside diameter approximately equal to the diameter of inner furnace wall 3.

Fuels which may be used in internal burner 10 include carbon monoxide, natural gas, or any hydrocarbon fuel, a suspension of carbon particles, elemental sulfur, sulfur chloride and so forth.

Depending upon the fuel used, the theoretical flame temperature of the burning fuel may vary between about 3000° F. and 20,000° F., and the quantity of fuel used may vary between about 0.01 to about 4 pounds of fuel per pound of $TiCl_4$ reacted.

The quantity of fuel burned should preferably be sufficient to insure the creation of a high temperature area within the reaction space having a temperature between about 900° F. and 3000° F.

In starting up the reactor, internal burner 12 is operated to raise the temperature of the upper part of the reactor to between 900° F. and 3000° F., and preferably to about 1300° F. to 1700° F. When adequate preheat temperature is reached, feeding of the titanium tetrachloride and auxiliary gas is commenced.

Auxiliary gas introduced through tangential ports 16, 18 and 20 sweeps into the reaction chamber tangentially to wall 3 and spirals around the incoming centrally disposed $TiCl_4$ stream. The auxiliary gas used is preferably any gas which is inert to the solid metal oxide particles formed by the reaction at the conditions at which the reaction occurs. Thus, the auxiliary gas may be air, chlorine, nitrogen, any of the noble gases, carbon dioxide and so forth.

The position of the auxiliary gas ports 16, 18 and 20 should be such that the auxiliary gas enters the reactor furnace 2 within a zone in which the $TiCl_4$ is undergoing oxidation and in which the temperature is sufficiently high to sustain the oxidation. This zone, hereinafter referred to as the reaction space, has definite limits. At its upper side shown in FIGURE 1, it is bounded by an atmosphere of gases within reactor 2 which contain substantial unreacted titanium tetrachloride. At its opposite or lower extremity shown in FIGURE 1 the reaction space is bounded by an atmosphere of reaction gas containing substantially no unreacted titanium tetrachloride. That is, the reaction at the lower extremity of the reaction space is essentially complete. When the $TiCl_4$ and/or $O_2$ are introduced into the furnace at about or just below reaction temperature, it should be understood that the upper side of the reaction space is bounded by the point of entry of the $TiCl_4$ stream.

It is readily apparent that the length and location of the reaction space varies with the rate and quantity of $TiCl_4$ feed. Hence, by varying the $TiCl_4$ feed rate, the length of the reaction space may be shortened or lengthened.

The temperature within the reaction space is about preheat temperature, i.e., about 900° F., at said upper side, rises sharply in temperature about 90° F. to 2700° F. from said one side to a high temperature point a short distance away from said one side, and then falls gradually in temperature to the lower extremity, said high temperature point being closer to the upper side than to the lower extremity of the reaction space.

Although only three auxiliary gas ports are shown, it should be understood that the invention is not limited in any way to the number or type of ports employed. Hence, more than or less than three ports can be advantageously employed in carrying out the process. Also, the auxiliary gas can be introduced continuously through an elongated continuous slot, or discontinuously through a plurality of slots. Further, if desired, all or a portion of the auxiliary gas may be introduced into the reactor mixed with the $TiCl_4$ feed stream.

In the preferred embodiment of the invention, a single auxiliary gas port is employed, which port is spaced diametrically opposite burner port 10, and in the vicinity of the high temperature point of the reaction space.

The quantity of auxiliary gas introduced is such that the auxiliary gas constitutes from about 10 percent to about 95 percent by volume of the total quantity of gases withdrawn from the reactor furnace, and preferably constitutes between about 20 percent and 80 percent by volume of the total gas outflow from the reactor, measured at standard conditions of temperature and pressure, i.e., 0° C. and 760 mm. pressure. The volume percent of a component of an ideal gaseous mixture at STP is equal to the mole percent, so that the volume percent of auxiliary gas given is approximately equal to the mole percent of the auxiliary gas in the exit gases.

The temperature of the auxiliary gas introduced into the reactor may vary from room temperature to the preheat temperature of the furnace, or higher. Preferably, the auxiliary gas is introduced at room temperature, although good results have been achieved by preheating the auxiliary gases to 900° F. or higher.

Titanium tetrachloride is introduced through port 22 in furnace cover 4. Port 22 may terminate flush with inside wall 3 of the reactor, or may project a considerable distance into the furnace. A nozzle may be inserted at the end of port 22, if desired. A nozzle is preferably used when the $TiCl_4$ fed to the reactor is a liquid.

The titanium tetrachloride may be introduced as a liquid or a vapor, and may or may not be mixed with oxygen or an oxygen-containing gas. If the titanium tetrachloride is not premixed with oxygen, sufficient oxygen or oxygen-containing gas should be introduced into the reactor to insure complete reaction with the quantity of $TiCl_4$ introduced. In the latter event, oxygen may conveniently be added with the fuel. It is also contemplated to introduce a separate stream of oxygen into the furnace. The quantity of oxygen introduced into the reactor should be greater than that stoichiometrically necessary to react with the quantity of $TiCl_4$ introduced. Thus, the ratio of oxygen to $TiCl_4$ introduced into the reactor may vary on a mole basis between about 1:1 and 10:1, and is preferably between about 1:1 and 5:1. It is to be understood that the above oxygen requirements are independent of the oxygen needed for the fuel combustion reaction.

The rate of flow of $TiCl_4$ should be such as to insure a time of reaction of less than about 6 seconds, and preferably less than about 0.1 second. The feed rate depends to a large extent on the type and rate of auxiliary gas flow, the position of the auxiliary gas inlet, temperature of the auxiliary gas, and the type and temperature of the turning fuel.

In carrying out an embodiment of the invention in the apparatus shown in FIGURE 4, an external burner 30 is substituted for the internal burner 12 of FIGURE 1.

Fuel, such as carbon monoxide, natural gas, solid carbon, sulfur chloride, sulfur and so forth is fed to the external burner 30 and ignited. The products of combustion are then fed via conduit 32 into tangential port 10 and thence into furnace 2. Port 10 terminates approximately flush with inner wall 3, and the hot combustion gases upon leaving port 10 sweep tangentially over internal reactor wall 3 and spiral around the $TiCl_4$ stream. Depending upon the feed used, the theoretical flame temperature of the burning fuel inside external burner 30 is between about 3000° F. and 30,000° F. The temperature of the combustion gas entering the furnace should be higher than about 500° F. and preferably between 1000° F. and 2000° F.

The $TiCl_4$ feed may or may not be premixed with oxygen or an oxygen-containing gas prior to introduction into reactor 2. If the $TiCl_4$ is not premixed with oxygen or an oxygen-containing gas, the oxygen may be added with the combustion gas, or may be added to the reactor as a separate stream. The molar ratio of $O_2$ to $TiCl_4$ fed to the reactor may vary between about 1:1 and 10:1, and is preferably between about 1:1 and 5:1. The quantity of $O_2$ introduced into the reactor should preferably be greater than that stoichiometrically required to react with the quantity of $TiCl_4$ introduced. The $TiCl_4$ fed to the reactor may be a liquid or a vapor. It should be understood that the above oxygen requirements are independent of the oxygen needed for the fuel combustion reaction.

The quantity of combustion gas introduced into the reactor should be such that the combustion gas constitutes between about 10 percent and 95 percent by volume of the total gases withdrawn from the furnace, preferably between about 20 percent and 80 percent, measured at conditions of standard temperature and pressure, i.e., 0° C. and 760 mm. mercury.

Introducing hot combustion gas, rather than a burning fuel, into the zone in which oxidation is taking place leads to a more uniform temperature within this zone. Further, the temperature profile within the reaction zone is considerably lower when hot combustion gas rather than a burning fuel is introduced thereinto. Both these results lead to a more uniform particle size, as well as higher tinting strength of the product produced.

Additionally, the particle sizes of the titanium dioxide product produced by this process is in a range such that further treatment of the product to improve the tinting strength is possible. Thus, when the product produced is heated for short intervals of time at temperatures of 900° F. to 1800° F. or higher, the tinting strength thereof is increased.

Heating of the product at elevated temperatures in the described manner is known as calcination, and, in addition to increasing tinting strength, also has the effect of removing occluded chlorine from the product. Calcination, however, will only lead to improved tinting strength when the product contains a large number of particles which approach, but are smaller than optimum size. Optimum particle size for pigment purposes is ordinarily considered to be about 0.25 micron. It has been discovered that calcination of a product containing a large number of particles close to but smaller than 0.25 micron will lead to growth of such particles to about optimum size, and thereby enhance the tinting strength of the product. With a product having a large number of particles greater than 0.25 micron in size, however, i.e., a coarse product, calcination has little effect on particle size, and consequently the tinting strength is little affected by such treatment.

The temperature of the hot combustion gas entering the reactor, as has been pointed out hereinabove, should be considerably lower than the flame temperature of the fuel burned to produce the combustion gas. Thus, whereas the theoretical flame temperature of the fuel within the external burner may vary from about 3000° F. to 30,000° F., depending, of course, upon the fuel used, the temperature of the combustion gases emanating from the external burner and introduced into the reactor need only be higher than about 500° F., and is preferably between about 1000° F. and 2000° F. Combustion within the external burner is substantially complete, so that the combustion gases emanating therefrom and fed into the reactor are substantially completely oxidized.

In this embodiment of the invention, auxiliary gas is not usually introduced into the reactor. However, if desired, auxiliary gas may be introduced into the reactor in the manner described in connection with FIGURES 1–3. The auxiliary gas may also be introduced into the reactor with the combustion gas as in this embodiment. This auxiliary gas should be inert to the solid metal oxide particles formed at the conditions of reaction, and gases contemplated for use herein include chlorine, air, nitrogen, carbon dioxide, any of the noble gases, and so forth. The amount of auxiliary gas introduced should be such that the auxiliary gas constitutes between about 10 percent and 95 percent by volume of the total quantity of gases withdrawn from the reactor, and is preferably between about 20 percent and 80 percent by volume of the withdrawn gases, measured under standard conditions of temperature and pressure.

Figures 7, 8:
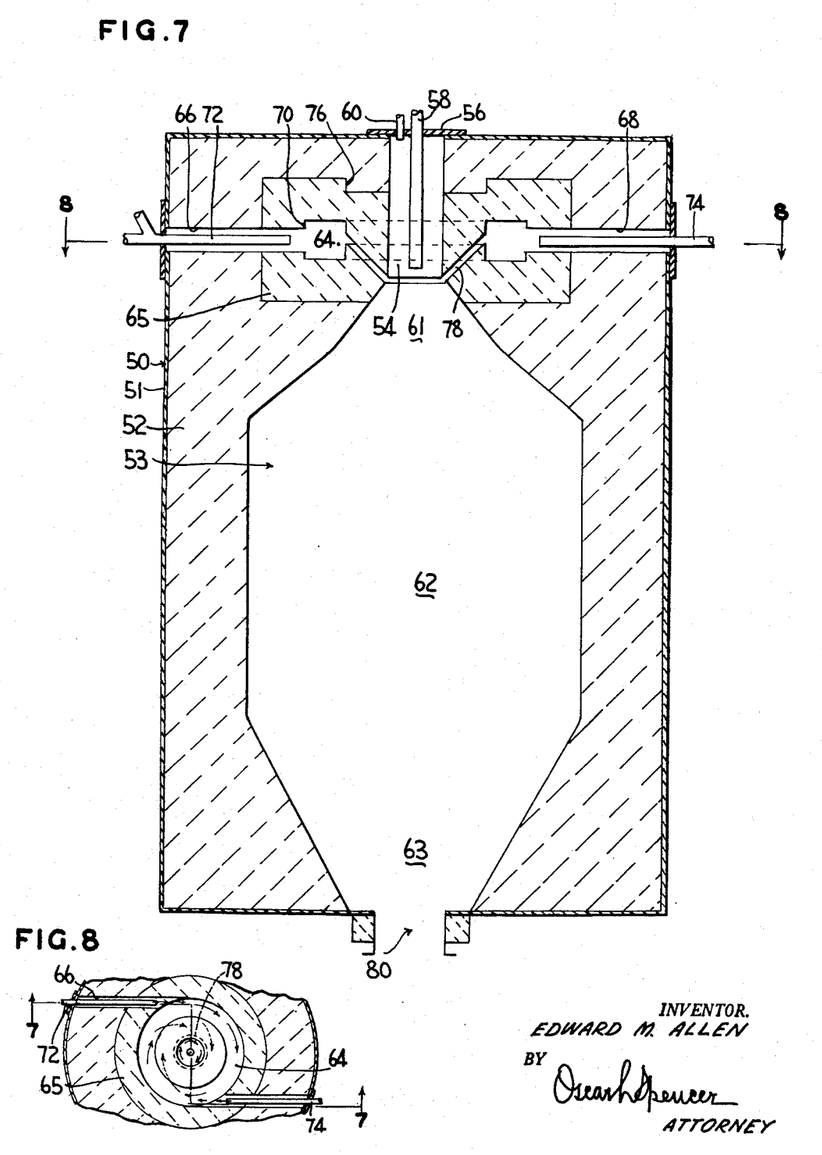
FIGURE 7 is a vertical-sectional view of a reactor used to carry out the present invention which is taken substantially along the line 7—7 of FIGURE 8.
FIGURE 8 is a fragmentary horizontal section of the reactor shown in FIGURE 8 taken along the line 8—8 of FIGURE 7.

FIGURES 7 and 8 show reactor 50 which is used to carry out the present invention. This reactor comprises essentially a hollow cylindrical vessel having a metal casing 51 and heat insulating walls 52 and 65.

Centrally located at the top of the reactor is a relatively narrow hollow shaft 54 surrounded by insulating walls 52 and 65 and sealed from the atmosphere by a cover 56. Projecting through the cover 56 into the hollow shaft 54 are a titanium tetrachloride feed pipe 58 and a pipe 60 used to pass inert gas into the shaft to prevent growth of titanium dioxide crystals on feed pipe 58 and the combustion gas inlet 78.

The central shaft 54 leads to a relatively large chamber designated generally at 53 inside reactor 50 and surrounded by insulating wall 52.

Surrounding central shaft 54 and separated therefrom by insulation 65 is an annular combustion chamber 64. Combustion chamber 64 communicates with the outside wall of reactor 50 via ports 66 and 68. These ports extend through the wall 52 of the reactor and additional insulation 65 surrounding combustion chamber 64 and project tangentially into combustion chamber 64 at the outer periphery 70 thereof. Inserted in port 66 is a tube 72 leading to the fuel feeding system shown in FIGURE 9. Port 68 contains a preheat gas tube 74 which is connected to a source of gaseous fuel (not shown) used to preheat the reactor.

Extending from the inner periphery 76 of combustion chamber 64 to the outer periphery of central shaft 54 is an annular slot 78 which serves to connect combustion chamber 64 with central shaft 54. Slot 78 extends completely around the outer periphery of hollow shaft 54 as is shown more clearly in FIGURE 8. Although an annular slot type of combustion gas inlet to the reaction zone is preferred, it should be understood that other inlets, for example a plurality of ports extending between the combustion chamber and the reaction zone may also be employed. Such ports could be slot-shaped or any other shape, such as circular, elliptical, and so forth. Preferably, the ports would have a tangential entry into shaft 54, so that the combustion gas would enter the shaft tangentially to the wall formed by insulating material 65. If desired, however, these ports could enter the shaft at any angle to the horizontal. Also, the annular slot (or the ports if used) extending between the combustion chamber and central shaft may form an angle with the vertical, as shown, or may be horizontally disposed therebetween.

The combustion gases produced in the combustion chamber 64 have a gently swirling motion caused by the tangential feed of the ignitible mixture into this chamber. This swirling motion is retained by the combustion gases as they pass through annular slot 78, so that the combustion gases enter the hollow shaft 54 with a substantial tangential component of velocity and swirl around the centrally flowing titanium tetrachloride stream, as shown by the arrows in FIGURE 8.

The interior wall of the reactor slopes outwardly from the central shaft 54 at about a 45° angle as illustrated to form an upper reaction zone 61. Descending through reactor 50, the internal wall then becomes vertical for an appreciable distance, thereby forming a central reaction zone 62, after which it slopes inwardly to outlet 80, thus forming a lower reaction zone 63. The majority of the reaction occurs in the upper reaction zone 61, the reaction being substantially complete by the time the gases reach lower reaction zone 63. The hot reaction product is withdrawn from outlet 80 and sent to recover equipment (not shown). Additional product outlets may be provided along the sides of the reactor, if desired. An inspection or cleanout door may also be provided along the side of the reactor.

Figure 9:
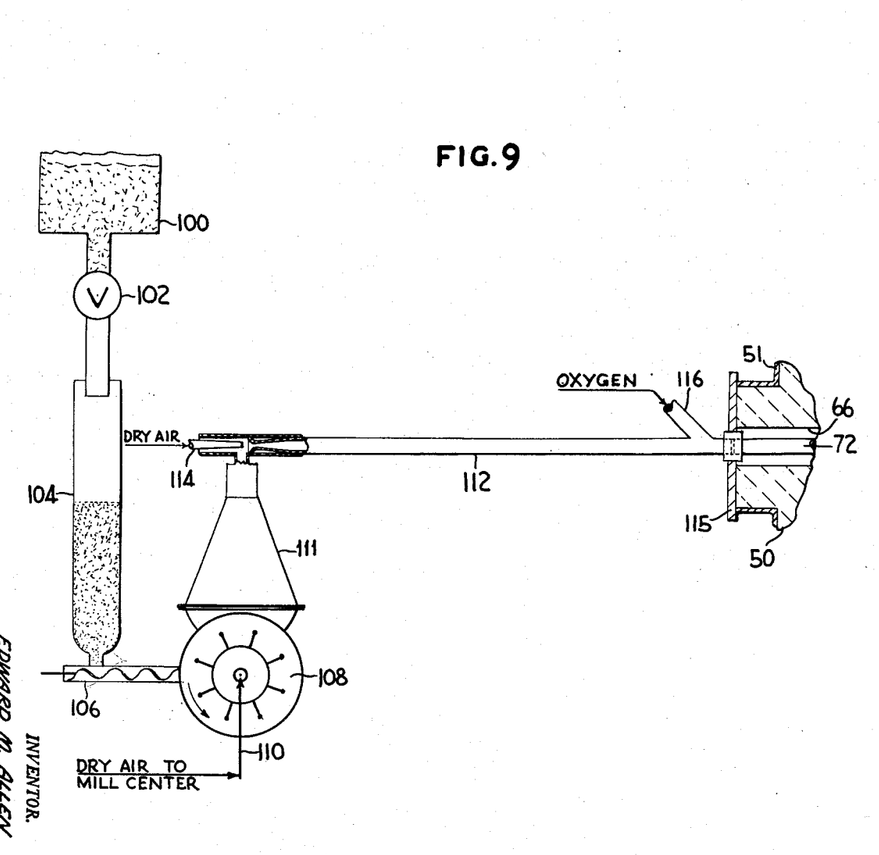
FIGURE 9 is a diagrammatic illustration of a feed system employed to prepare the ignitible mixture of solid carbonaceous material and oxygen containing gas fed to the reactor shown in FIGURE 7.

FIG. 9 shows a schematic diagram of the system used to prepare and introduce the ignitible mixture of solid carbonaceous material and oxygen-containing gas to the combustion chamber 64 shown in FIGURE 7. The feed system comprises a hopper 100 for storage of the solid particulate carbonaceous material. The carbonaceous material is charged via gate valve 102 to a calibrated glass pipe 104 which measures the volumetric rate of flow of the solid fuel. At the bottom of measuring pipe 104 is a variable speed screw conveyor 106 which transports the solid carbonaceous material from the measuring pipe 104 to a hammer mill 108. A line for introducing dry air into the center of the hammer mill is shown linearly at 110. The mill housing 111 is turned upside down so that the mill discharges upwardly as shown into the ignitible mixture feed pipe 112. At the left side of pipe 112 is inserted a pneumatic ejector 114 to aid in pumping the mixture produced by the hammer mill 108 through feed pipe 112. At its right end shown in FIGURE 8, feed pipe 112 is connected with tube 72 in port 66 leading to combustion chamber 64. The connection between pipes 112 and tube 72 is made by means of flange 115. Also present at the right end of pipe 112 is an auxiliary oxygen line 116 which is connected to oxygen cylinders (not shown) and supplies additional oxygen to the mixture in pipe 112.

In the operation of the devices shown in FIGS. 7 to 9, solid, particulate carbonaceous material is charged to hopper 100 and fed periodically through gate valve 102 into calibrated glass pipe 104. The charge is withdrawn continuously from glass pipe 104 by screw conveyor 106 and fed to hammer mill 108, where the solid carbonaceous material is micropulverized. The feed rate is measured by noting the difference in level in glass pipe 104 with time.

In hammer mill 108 the fuel is mixed with dry air fed into the center of the mill through line 110. The hammer mill acts like a centrifugal blower and discharges the mixture with a high velocity through mill housing 111 and into feed pipe 112. The velocity of the mixture is further increased by reduction in volume as it is passed into feed pipe 112, and by action of ejector 114. Additional air is fed through ejector 114 into feed pipe 112 to further increase pumping efficiency in the feed tube. Ejector 114 pulls a slight vacuum on the mill so that the screw feeder 106 operates under a slight vacuum. The hammer mill is equipped with special seals to avoid air leakage into the system, and rotometers are used to measure the volume of air introduced both to the mill and the ejector.

The mill discharge is placed upwardly in order to prevent plugging of the ejector caused by particles of the solid material falling off the mill rotor and discharging into the ejector.

Oxygen from cylinders passes through pipe 116 and rotometers and is introduced into the mixture flowing through pipe 112 just prior to feeding of the ignitible mixture to the combustion chamber 64.

The ignitible mixture from the solid feed system is fed tangentially into combustion chamber 64 from tube 66 and ignited. Tangential feeding of the ignitible mixture into chamber 64 causes the mixture to swirl around the walls of the annular chamber, thereby keeping the solid material in suspension and preventing precipitation thereof.

The hot combustion gas generated in chamber 64 escapes with free or unimpeded flow through slot 78 and passes into hollow shaft 54 with a gently swirling motion and with a substantial component of velocity tangential to the outer periphery of the hollow shaft.

This flow pattern may be readily seen by supporting a wire frame having streamers of cloth attached thereto in the hollow shaft at the level of the annular shaft and passing air through the combustion chamber. With flow rates similar to those used when the reaction is being carried out, the streamers are observed to be arranged tangentially in the hollow shaft, and the streamers adjacent the walls are observed to be pressed against the wall in a tangential direction.

Once in the hollow shaft, the combustion gases contact a centrally flowing titanium tetrachloride stream fed through feed pipe 58. An inert gas such as chlorine or air is fed through pipe 60 to prevent formation of crystals on the $TiCl_4$ feed pipe 58 and combustion gas inlet 78. Upon contact between the titanium tetrachloride and hot combustion gas in upper reaction zone 61, reaction occurs and a hot suspension of titanium dioxide in resulting reaction gases is produced. The suspension is withdrawn from reactor 1 through outlet 80, and sent to further processing equipment for recovery of the titanium dioxide and chlorine.

Various additives, such as metal chlorides, white metal oxides, chlorine, aromatic organic compounds, or water may be added to any of the reaction spaces described above as set forth in the following applications:

U.S. Serial No. 696,473, filed November 15, 1957;
U.S. Serial No. 743,946, filed June 23, 1958;
U.S. Serial No. 745,627, filed June 30, 1958;
U.S. Serial No. 743,840, filed June 23, 1958.

The instant invention will best be understood in connection with the following examples, which, though specific are not intended to limit the scope of the invention in any way.

*Example I*

The vertical reactor of FIGURES 1 to 3 consisted of an 11½ foot long, fire brick lined, steel column, which has a 14 inch internal diameter and a 23 inch outside diameter on top of which was cemented an 8 inch internal diameter Denver Fire Clay Company furnace, which measured 1 foot in length. The connection between the 8 and 14 inch sections was made by staggering 6 layers of 3 inch brick, 1 inch at each level.

Two tangential ports, 3 inches in diameter, respectively, and 180 degrees apart, were provided in the Denver section, corresponding to burner port 10 and auxiliary gas port 16 in the drawings. These ports were located about 6 inches below the top of the furnace. In port 10 was attached a Selas "Duradiant" burner. Additional auxiliary gas ports corresponding to ports 18 and 20 in FIGURE 3 were located at points 2½ and 4 feet, respectively, below the inside surface of cover 4. Ports 18 and 20 were 1 inch in diameter, respectively. Into cover 4 which was 5 inches thick was threaded a 1 inch nickel nipple. A ceramic brick surrounded the section of the nipple within cover 4 and extended from the outer to the inner surface of cover 4. The nipple terminated flush with the inner surface of cover 4.

The product was removed from the bottom of the reactor as indicated by the arrow. The column bottom tapered from 14 inches to 3 inches at the bottom as indicated in FIGURE 1. The product except for samples was sent to a caustic scrubber, where the $Cl_2$ and $TiO_2$ were removed, and the residue gases exhausted to the atmosphere.

A Hoffman blower was used to maintain a negative pressure in the entire system. A vacuum of 0.5 to 1.5 inches of water was maintained in the Denver section during the runs.

In making this run for control purposes no auxiliary gas was fed to the auxiliary gas ports Carbon monoxide was fed to internal burner 12 and burned until the temperature in the Denver section of the reactor reached about 1600° F., at which time the furnace was ready for operation.

Titanium tetrachloride was first preheated by 100 p.s.i.g. steam and then vaporized in a 3 foot long electrically heated section of a 2 inch nickel pipe. The line from the vaporizer to the reactor cover was wrapped with heating wire. The preheated $TiCl_4$ was mixed with oxygen at room temperature and the resulting mixture was fed through port 22 at a rate sufficient to supply 25 cc./min. of $TiCl_4$ to the furnace. The mole ratio of $O_2$ to $TiCl_4$ in the feed stream was 1.2:1.

The run was continued for 55 minutes. Carbon monoxide was burned in internal furnace 12 at a rate 1.8 pounds of CO per pound of $TiO_2$ produced. The temperature of the reaction space 4¾ inches below cover 4 was 1495° F. and 36 inches below cover 4 was 1230° F. A gaseous suspension of $TiO_2$ was withdrawn from the bottom of the reactor at a rate of 1.4 s.c.f.m. (standard cubic feet per minute). The tinting strength of the product obtained was 350, and it measured 4.7 percent rutile. The average residence time of the titanium tetrachloride within the reaction space was 6.6 seconds.

*Example II*

Example I was repeated using the reactor of FIGURES 1–3 and the same conditions and feed rates as in Example I. Air was continuously introduced into the reactor via tangential port 16 at a rate of 2.2 s.c.f.m. The air entered the reactor via the opening of port 16 into the reactor and flowed tangentially to inner wall 3. The titanium tetrachloride reaction mixture was projected centrally into the tangentially flowing stream of air. The run was continued for 75 minutes. Carbon monoxide was burned in internal burner 12. The pounds of carbon monoxide burned per pound of titanium dioxide produced equalled 2.4. The temperature of the reaction space 4¾ inches below cover 4 was 1520° F., and 36 inches below cover 4 was 1340° F. A gaseous suspension of $TiO_2$ was withdrawn from the bottom of the reactor at a rate of 4.5 s.c.f.m. The product produced had a tinting strength of 780 and it measured 14.2 percent rutile. The air introduced into the reactor via port 16 constituted 49 percent by volume of the gases withdrawn from the reactor.

*Example III*

Example II was repeated except that the flow rate of air continuously fed tangentially through port 16 was increased to 4.4 s.c.f.m. The run was continued for 40 minutes. The pounds of carbon monoxide burned per pound of titanium dioxide produced was 2.4. The temperature within the reaction space at a distance 4¾ inches below port 22 was 1480° F., and 36 inches below port 22 was 1390° F. A gaseous suspension of $TiO_2$ was withdrawn from the bottom of the reactor at a rate of 6.2 s.c.f.m. The product produced had a tinting strength of 900 and it measured 98.4 percent rutile. The air introduced into the reactor via port 16 constituted 70 percent by volume of the gases withdrawn.

*Example IV*

Example II was repeated except that chlorine gas was continuously introduced through port 16. The rate of chlorine gas fed through 16 was 2.2 s.c.f.m. The run was continued for 85 minutes. The pounds of carbon monoxide burned per pound of titanium dioxide produced was 2.6. The temperature of the reaction space measured 1500° F. at a distance 4¾ inches below port 22 and 1470° F. at a distance 36 inches below port 22. A gaseous suspension of $TiO_2$ was withdrawn from the bottom of the reactor at a rate of 4.1 s.c.f.m. The tinting strength of the product was 600, and it measured 17 percent rutile. The chlorine introduced through port 16 constituted 53.5 percent by volume of the gases withdrawn.

*Example V*

Example IV was repeated except that the rate of chlorine fed through port 16 was increased to 4.4 s.c.f.m. The run was continued for 50 minutes. The pounds of carbon monoxide burned per pound of titanium dioxide produced was 3.2. The temperature of the reaction space at a distance 4¾ inches below port 22 was 1490° F., and at a distance 36 inches below port 22 was 1550° F. The total flow of gaseous reaction product withdrawn from the bottom of the reactor measured 6.6 s.c.f.m. The product had a tinting strength of 870 and it measured 66.3 percent rutile. The chlorine gas introduced constituted 66.5 percent by volume of the gases withdrawn.

*Example VI*

Example II was repeated except that the average temperature of the reactor was raised to about 1625° F. to 1650° F., and the rate of titanium tetrachloride fed to the reactor was increased to 52 cc. per minute. The mole ratio of $O_2$ to $TiCl_4$ in the feed mixture was 1.2:1. Air was fed through port 16 at a rate of 2.2 s.c.f.m. The run was continued for 80 minutes. The pounds of carbon monoxide burned per pound of titanium dioxide produced was 1.6. The temperature of the reaction space 4¾ inches below port 22 was 1700° F., and 36 inches below port 22 was 1530° F. A gaseous suspension of titanium dioxide was withdrawn from the bottom of the reactor at a rate of 5.1 s.c.f.m. The product produced had a tinting strength of 820 and it measured 32.5 percent rutile. The air introduced through port 16 constituted 43 percent by volume of the gases withdrawn.

*Example VII*

Example VI was repeated except that the rate of flow of air through port 16 was increased to 4.4 s.c.f.m. The run was continued for 65 minutes. The temperature of the reactor 4¾ inches below port 22 measured 1630° F., and 36 inches below port 22 measured 1600° F. The pounds of carbon monoxide burned per pound of titanium dioxide produced was 1.8. A gaseous suspension of $TiO_2$ was withdrawn from the bottom of the reactor at a rate of 7.3 s.c.f.m. The product $TiO_2$ had a tinting strength of 1250 and it measured 21 percent rutile. The air introduced through port 16 constituted 58 percent by volume of the gases withdrawn.

*Example VIII*

Example VI was repeated except that chlorine was substituted for air as the auxiliary gas fed through port 16. Chlorine gas at a rate of 2.2 s.c.f.m. was fed through port 16. The run was continued for 55 minutes. The pounds of carbon monoxide burned per pound of titanium dioxide produced was 1.6. The temperature of the reactor 4¾ inches below port 22 measured 1690° F., and 36 inches below port 22 measured 1560° F. A gaseous suspension of $TiO_2$ was withdrawn from the reactor at the bottom at a rate of 4.7 s.c.f.m. The tinting strength of the product was 970 and it measured 80.2 percent rutile. The chlorine introduced through port 16 constituted 47 percent by volume of the gases withdrawn.

*Example IX*

Example VI was repeated for control purposes. The auxiliary gas ports were sealed and no auxiliary gas was fed to the reactor. The run was continued for 55 minutes. Pounds of carbon monoxide burned per pound of titanium dioxide produced was 0.9. The temperature of the reaction space 4¾ inches below port 22 was 1630° F., and 36 inches below port 22 was 1380° F. A gaseous suspension of $TiO_2$ was withdrawn from the bottom of the furnace at a rate of 1.8 s.c.f.m. The tinting strength of the product was 730 and it measured 33.3 percent rutile.

*Example X*

Example VI was repeated with the exception that 1 to 2 mole percent of water vapor, based upon the quantity of TiCl$_4$ introduced to the reactor, was added to the titanium tetrachloride feed stream. The water was added by bubbling the reactant oxygen through water prior to mixing it with the titanium tetrachloride. Air was fed through port 16 at a rate of 2.6 s.c.f.m. The run was continued for 50 minutes. Pounds of carbon monoxide burned per pound of titanium dioxide produced was 1.2. The temperature of the reactor 4¾ inches below port 22 was 1680° F., and 36 inches below port 22 was 1360° F. A gaseous suspension of TiO$_2$ was withdrawn from the bottom of the reactor at a rate of 4.7 s.c.f.m. The tinting strength of the product was 910 and it measured 46.3 percent rutile. The air introduced through port 16 constituted 55 percent by volume of the gases withdrawn.

*Example XI*

Example VI was repeated except that aluminum chloride was added to the air stream fed through port 16. The AlCl$_3$ was aspirated into the air stream prior to introduction of this stream into the furnace in tangential port 16. The rate of flow of air through port 12 was 2.6 s.c.f.m. The rate of AlCl$_3$ introduced with the air equalled 3 mole percent of the quantity of TiCl$_4$ introduced. The pounds of carbon monoxide burned per pound of titanium dioxide produced was 1.6. The temperature of the reactor 4¾ inches below port 22 was 1700° F., and 36 inches below port 22 was 1540° F. A gaseous suspension of TiO$_2$ was withdrawn from the bottom of the reactor at a rate of 5.1 s.c.f.m. The tinting strength of the product was 1260 and it measured 95.0 percent rutile. The air introduced through port 16 constituted 51 mole percent of the gases withdrawn. The product was calcined to a tinting strength of above 1600.

*Example XII*

Example VI was repeated using liquid titanium tetrachloride feed rather than vapor titanium tetrachloride feed. Liquid titanium tetrachloride was atomized into gaseous oxygen to produce a spray, and the spray was fed through port 22 in cover 4 of reactor 2. The rate of flow of the reaction mixture was sufficient to supply 52 cc./mm. of TiCl$_4$ into the reactor. In this example for control purposes the auxiliary gas feed ports were sealed and no auxiliary gas was fed to the reactor. The reaction was continued for 40 minutes. The pounds of carbon monoxide burned per pound of titanium dioxide produced was 1.70. The temperature of the reactor space 4¾ inches below port 22 was 1830° F., and 36 inches below port 22 was 1450° F. A gaseous suspension of TiO$_2$ was withdrawn from the bottom of the reactor at a rate of 3.7 s.c.f.m. The tinting strength of the product was 750 and it measured 17.8 percent rutile.

*Example XIII*

Example XII was repeated except that 8.3 s.c.f.m. of air was introduced into port 12. The run was continued for 65 minutes. The pounds of carbon monoxide burned per pound of titanium dioxide produced was 1.9. The temperature of the reaction space 4¾ inches below port 22 was 1750° F., and 36 inches below port 22 was 1530° F. A suspension of TiO$_2$ was withdrawn from the furnace at a rate of 11.20 s.c.f.m. The tinting strength of the product was 1360 and it measured 24.7 percent rutile. The air introduced through port 16 constituted 74 mole percent of the gases withdrawn. The product produced was calcined, and after calcination the tinting strength of the product measured above 1600.

*Example XIV*

The procedure in this example was essentially the same as that employed in Example I. Natural gas rather than carbon monoxide was burned in internal burner 10. The preheat temperature of the titanium tetrachloride feed stream was 450° F. The molar ratio of oxygen to titanium tetrachloride in the feed stream was increased to 1.3 to 1. TiCl$_4$ was mixed with oxygen in the manner described in Example I and the resulting mixture was fed to the reactors at a rate sufficient to provide 250 cc. per minute of TiCl$_4$ to the reactor. The run was continued for 120 minutes. The pounds of natural gas burned per pound of titanium dioxide produced was 0.04. Chlorine gas was continuously fed through tangential port 16 at a rate of 2.2 s.c.f.m. The temperature of the reactor space 4¾ inches below port 22 was 1300° F., and 36 inches below port 22 was 1500° F. A gaseous suspension of TiO$_2$ was withdrawn from the bottom of the reactor at a rate of 8.35 s.c.f.m. The tinting strength of the product was 1280 and it measured 87.7 percent rutile.

*Example XV*

This example was performed using the apparatus of FIGURE 4 equipped with external burner 30. External burner 30 was a cyclone burner of the type described hereinabove. Natural gas entered at the top of the burner as indicated and was introduced into the bottom third of the volute through a quartz tube. There it was mixed with air and oxygen. Combustion in the burner took place as the gases mixed through the volute. The hot combustion products from the burner were conducted via insulated conduit 32 into tangential port 10 and thence into the reactor. Tangential port 10 was 1 inch in diameter. The combustion gases flowed within the top of the reactor in a direction tangential to inner wall 3. As shown in FIGURES 4–5 the gas entered perpendicular to the figure and tangentially to the left side producing a clockwise gas flow.

Titanium tetrachloride was first preheated by 100 p.s.i.g. steam and then vaporized in a 3 foot long electrically heated section of a 2 inch nickel pipe. The line from the vaporizer to the reactor cover was wrapped with heating wire. The preheated TiCl$_4$ was mixed with O$_2$ to provide the feed mixture. The mole ratio of oxygen to titanium tetrachloride in the feed mixture was 2.7:1. The auxiliary gas ports of the reactor were sealed and no auxiliary gas was fed to the reactor. The reaction mixture was fed to the reactor at a rate sufficient to provide 200 cc. per minute of TiCl$_4$ to the reactor. The temperature of the titanium tetrachloride feed was 590° F. The feed mixture was projected centrally into the reactor and within the tangentially flowing combustion gas. The pounds of natural gas burned in the external burner was 0.09 pound per pound of titanium dioxide produced. The run was continued for 120 minutes. The temperature of the reactor space 4¾ inches below port 22 was 1590° F., and 36 inches below port 22 was 1430° F. A gaseous suspension of TiO$_2$ was withdrawn from the bottom of the reactor at a rate of 9.4 s.c.f.m. The tinting strength of the product was 1430 and it measured 80.7 rutile. The product was calcined to a tinting strength above 1600.

*Example XVI*

Example XV was repeated except that carbon monoxide was used as the fuel in external burner. The auxiliary gas ports were sealed and no auxiliary gas was fed to the reactor. The TiCl$_4$ was preheated as described in Example XV to a temperature of 600° F. The rate of feed of the reaction mixture was sufficient to supply 150 cc./mm. of TiCl$_4$ to the reactor. The mole ratio of O$_2$ to TiCl$_4$ in the feed mixture was 2.0:1. The run was continued for 150 minutes. The pounds of carbon monoxide burned per pound of titanium dioxide produced was 0.9. The temperature of the reaction space 4¾ inches below port 22 was 1610° F., and 36 inches below port 22 was 1460° F. A gaseous suspension of TiO$_2$ was withdrawn from the bottom of the reactor at a rate of 12.1 s.c.f.m. The tinting strength of the product was 1430 and it measured 56.9 percent rutile. The product was calcined to a tinting strength of above 1600.

*Example XVII*

In performing this example substantially the same procedure was used as was employed in Example II except that port 16 was sealed and the auxiliary gas was introduced through port 18 which was located 2½ feet below the entrance of port 22. The mole ratio of oxygen to titanium tetrachloride in the feed mixture was 1.3:1. The $TiCl_4$ was preheated to a temperature of 420° F. The rate of feed of the reaction mixture was sufficient to supply 250 cc./mm. of $TiCl_4$ to the reactor. The pounds of the natural gas burned per pound of titanium dioxide produced was 0.04. Tangential ports 16 and 20 were sealed, and port 18 was opened. Chlorine gas was fed through port 18 at a rate of 5.2 s.c.f.m. The temperature of the reactor 4¾ inches below port 22 was 1300° F., and 36 inches below port 22 was 1350° F. A gaseous suspension of $TiO_2$ was withdrawn from the bottom of the reactor at a rate of 10.7 s.c.f.m. The tinting strength of the product was 1260 and it measured 89.4 percent rutile. Chlorine introduced through port 18 constituted 48.5 mole percent of the gases withdrawn.

*Example XVIII*

Example II was repeated except that ports 16 and 18 were sealed and the auxiliary gas was fed through port 20, which was located 4 feet below the inside wall of cover 4. The mole ratio of oxygen to titanium tetrachloride in the feed mixture was 1.3:1. The $TiCl_4$ was preheated to a temperature of 420° F. The rate of feed of the reaction mixture was sufficient to supply 250 cc. per minute of $TiCl_4$ to the reactor. The run was continued for 120 minutes. The rate of chlorine gas fed through port 20 was 4.6 s.c.f.m. The temperature of the reactor space 4¾ inches below port 22 was 1330° F., and 36 inches below port 22 was 1750° F. The pounds of natural gas burned per pound of titanium dioxide produced was 0.04. The total rate of gases withdrawn from the bottom of the reactor was 10 s.c.f.m. The tinting strength of the product was 1270 and it measured 97.5 percent rutile. The chlorine fed through port 20 constituted 46 percent of the gases withdrawn. The product was calcined, and after calcination the tinting strength measured 1620.

*Example XIX*

Example II was repeated except that all the auxiliary gas ports, i.e., 16, 18 and 20 were unsealed and chlorine gas fed through ports 16, 18 and 20 simultaneously. The titanium tetrachloride feed was preheated to 500° F. The mole ratio of oxygen to titanium tetrachloride in the feed mixture was 1.8:1. The rate of feed of the reaction mixture was sufficient to provide 200 cc. per minute of $TiCl_4$ to the reactor. The run was continued for 180 minutes. The total amount of chlorine gas fed through ports 16, 18 and 20 was 6.6 s.c.f.m. The temperature of the reactor space 4¾ inches below port 22 was 1340° F., and 36 inches below port 22 was 1530° F. The pounds of natural gas burned per pound of titanium dioxide produced was 0.05. A gaseous suspension of $TiO_2$ was withdrawn from the bottom of the reactor at a rate of 11.8 s.c.f.m. The tinting strength of the product was 1280 and it measured 89.5 percent rutile. The chlorine gas fed to the reactor via ports 16, 18 and 20 constituted 56 percent of the gases withdrawn.

*Example XX*

Example II was repeated except that auxiliary gas port 16 was sealed and the auxiliary gas was fed through ports 18 and 20 which were located 2½ feet and 4 feet respectively below the inside wall of cover 4. The titanium tetrachloride feed was preheated to 500° F. The mole ratio of oxygen to titanium tetrachloride in the feed mixture was 1.4:1. The rate of flow of the feed mixture was sufficient to provide 200 cc. per minute of $TiCl_4$ to the reactor. The pounds of natural gas burned per pound of titanium dioxide produced was 0.05. The length of the run was 180 minutes. The total rate of chlorine fed through ports 18 and 20 was 6.5 s.c.f.m. The temperature of the reactor 4¾ inches below port 22 was 1560° F. and 36 inches below port 22 was 1450° F. A gaseous suspension of $TiO_2$ was withdrawn from the bottom of the reactor at a rate of 11.4 s.c.f.m. The tinting strength of the product was 1380, and it measured 77.6 percent rutile. The chlorine gas fed through ports 18 and 20 constituted 57 mole percent of the gases withdrawn. The product was calcined, and after calcination the tinting strength of the product measured 1650.

Figure 6:
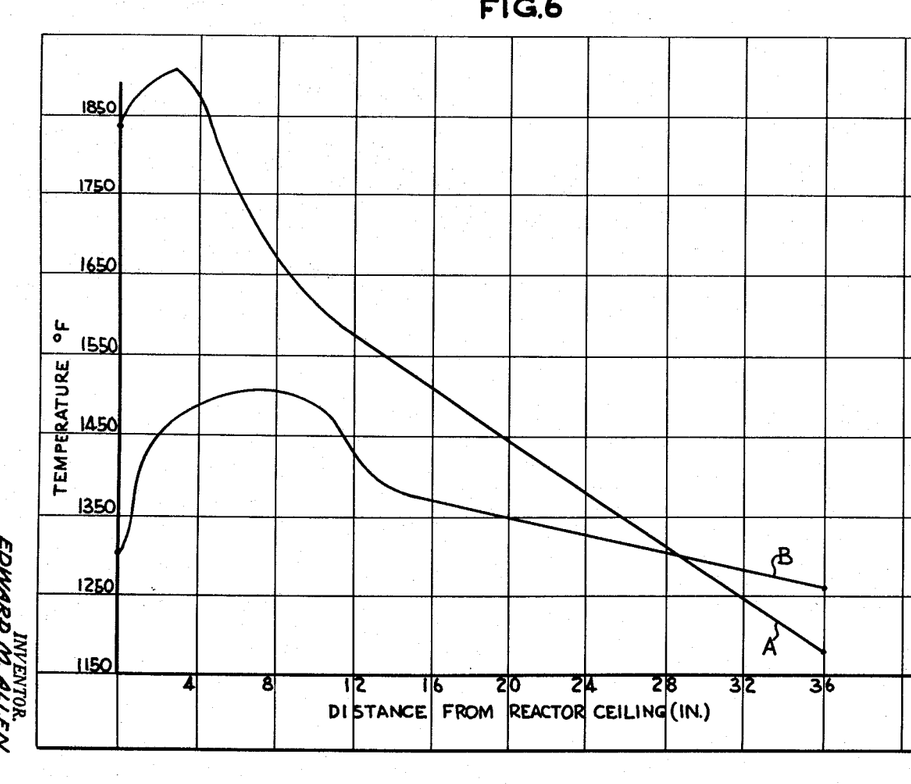
FIGURE 6 is a graph of reactor temperature profiles.

Reaction temperatures were recorded while the reaction was being run to obtain reaction temperature profiles within the reactor. FIGURE 6 is a graph of the reactor temperature profiles obtained.

Curve A is a plot of the reactor temperature profiles of internal burner type of reactor shown in FIGURES 1–3. Carbon monoxide was burned in internal burner 12. Titanium tetrachloride was mixed with oxygen in the manner described in Example I and the resulting mixture was fed to the reactor via port 22. The mole ratio of oxygen to titanium tetrachloride in the feed stream was 1.4:1. The rate of flow of the reaction mixture was sufficient to provide 51 cc. per minute of $TiCl_4$ to the reactor. No auxiliary gas was fed to the reactor. Thermocouples were located at distances 0, 3, 6, 9, 12 and 36 inches respectively below the top of the reactor, and temperatures were continuously recorded while the run was being made.

The run was continued for 30 minutes. Pounds of carbon monoxide burned per pound of $TiO_2$ produced was 1.5. The theoretical flame temperature of the burning fuel stream was about 5800° F. A gaseous suspension of $TiO_2$ was continuously withdrawn from the bottom of the reactor at a rate of 3.5 s.c.f.m.

As is shown in curve A of FIGURE 4, the temperature within the reactor increased sharply from the top of the reactor to a high temperature point about 3 inches below the top, and then fell sharply to a distance about 6 inches below the top of the reactor. The temperature then fell gradually throughout the lower part of the reaction zone, the reaction being essentially complete at a distance about 36 inches from the top.

Curve B of FIGURE 6 is a plot of the reactor temperature profile for the reactor shown in FIGURES 4–5. Carbon monoxide was burned in external burner 30. Titanium tetrachloride was mixed with oxygen as described in Example XV and the resulting mixture was fed to the reactor via port 22. The mole ratio of oxygen to $TiCl_4$ in the feed stream was 6.6:1. The reaction mixture flow rate was sufficient to supply 51 cc. per minute of $TiCl_4$ to the reactor. No auxiliary gas was fed to the reactor. Thermocouples were located at the same positions described above in connection with curve A, and the temperatures at these positions were continuously recorded. The run was continued for 300 minutes. Pounds of carbon monoxide burned per pound of $TiO_2$ produced was 2.3. A gaseous suspension of $TiO_2$ was drawn from the bottom of the furnace at a rate of 11.2 s.c.f.m.

As can be seen from curve B, the average temperature within the reactor was lower than that obtained for the internal burner type of reactor shown in FIGURES 1 to 3. The temperature of the reactor shown in FIGURE 3 increased sharply from the top of the reactor about 200° F. to a point about 6 inches below the top and then decreased gradually to a point about 36 inches below the top. The increase and decrease in temperature to and from the high temperature area was far more gradual for the reactor shown in FIGURES 4–5 than for the reactor shown in FIGURES 1–3.

*Example XXI*

In carrying out this example, the apparatus shown in FIGURES 7 to 9 was employed.

Reactor 50 was 80 inches in overall length, had an outside diameter of 42 inches, and was lined throughout its entire length with insulating fire brick. The inside diameter of the reactor in central vertical zone 61 was 30 inches, and the wall 52 adjacent this section consisted of insulating fire brick 6 inches thick. Central shaft 54 was 7 inches in diameter and 18 inches long. In upper reaction zone 61, the wall 52 tapered outwardly at a 45° angle from the central shaft to the vertical section of the reactor. The vertical length of upper reaction zone 61 was about 12 inches. The wall at the lower portion of the furnace tapered inwardly at an angle of about 30° to form lower reaction zone 63. The vertical height of lower reaction zone 63 was about 15 inches, so that the height of the central reaction zone 62 was 35 inches.

Combustion chamber 64 comprised an annular rectangular ring which had a mean diameter of 17 inches and was 4½ inches by 2½ in cross section. The ring was located 4½ inches from the periphery of central shaft 54 and 8⅜ inches from the top of reactor 50. The combustion chamber was surrounded by a layer of 70% aluminum fire brick 4½ inches thick on all sides.

Inlet 78 formed a continuous anular opening between the combustion zone and the central shaft. This opening was slot-shaped, had a width of ½ inch, and extended at about a 45° angle through the 70% aluminum fire brick insulation from the inner periphery 76 of the combustion chamber 64 to the outer periphery of central shaft 54. Outward tapering of the upper portion of the furnace wall commenced at the entrance of the slot-shaped, annular opening formed by inlet 78 into the central shaft. This tapering effect offered a continuously expanding reaction zone for the reactants and reduced the tendency of titanium dioxide particles to deposit on this wall.

Ports 66 and 68 were two inches in diameter, respectively, and extended from the outer wall of the reactor to outer periphery 70 of combustion chamber 64. The entries of both these ports into chamber 64 was tangential. Tubes 72 and 74, which were one inch in diameter, respectively, extended through ports 66 and 68, respectively, from the outer wall of reactor 50 through the layer of 70% aluminum fire brick to within 1 inch of the outer periphery of chamber 64.

Tube 72, which was made of nickel, was connected to the solid fuel feed system, and constituted the means by which the ignitible fuel mixture was fed to chamber 64. Tube 74 was connected to a source of gaseous fuel, which was used to preheat the reactor prior to commencing feeding of titanium tetrachloride.

Titanium tetrachloride feed tube 58 was a 1½ inch diameter tube which extended through cover 56 and into central shaft 54 a distance of 18 inches, so that its exit end was just about at the level of the combustion gas inlet into the central shaft 54. Inert gas tube 60 was 1 inch in diameter and projected through cover 56 and into the central shaft to a distance of about 1 inch.

In the carbon feed system, a "Pitchlor" can serve as the storage hopper 100 for the solid fuel, and emptied through a 2 inch gate valve 102 to a four inch diameter glass pipe 104 which was calibrated in inches and served to volumetrically measure the solid material fed to the system. Screw feeder 106 was a conventional screw conveyor with variable speed. Hammer mill 108 was a Bantum micro-pulverizer with a 3/16 inch circular hole "screen" at its discharge end. The mill housing was turned upside down so that the mill discharged upwardly into tube 112, which was one inch in diameter and was connected to tube 62 by flange plate 115. The ejector 114 was a 63A Penberty brass pneumatic ejector.

Air from the plant air system was passed through an aluminum dryer (not shown) and, after passing through rotometers (not shown), was fed via rotometers into air tube 110 into the center of the hammer mill, and into the pneumatic ejector 114. Oxygen tube 116 was located at the entrance of feed pipe 112 into the reactor, and oxygen was fed therethrough to the mixture in pipe 112.

The general procedure in making this run was as follows:

The furnace was preheated by feeding natural gas to chamber 64, where it was burned. The hot combustion gases escaped through slot 78 into reaction space within the furnace. Preheating was continued overnight, at which time the gas temperature in combustion chamber 64 was about 1900 to 2000° F., and the temperature of reaction space 53 reached 1300° F. By inspection through a sight glass, the 70% aluminum fire brick surrounding combustion chamber 64 was a bright orange color.

When the above-described preheat temperature was reached, continuous feeding of the solid carbonaceous fuel to the reactor was begun. The screw conveyor and hammer mill were turned on, and air was fed to the pneumatic ejector and the center of the hammer mill, and oxygen was fed through the oyxgen pipe. In making this run "Micronex" carbon, which was made by Columbia Carbon Company and had a hydrogen content of less than 3 percent by weight, was used as the solid carbonaceous fuel.

The "Micronex" carbon was periodically added to the calibrated glass pipe, and the carbon feed was measured by noting the difference in carbon level with time. The "Micronex" carbon weighed 80 grams per inch of height in the 4 inch glass pipe.

The hydraulic ejector pulled a slight vacuum on the hammer mill so that the screw feeder was under a slight vacuum. A monometer connected to the center of the hammer mill usually read 1 to 2 inches of mercury vacuum. Use of vacuum was found necessary in order to avoid binding of the "Micronex" carbon in the housing.

All of the oxygen that was required for the combustion of carbon and also that required for the oxidation of the titanium tetrachloride was added to combustion chamber 64. This had several advantages. Because the oxygen required for the $TiCl_4$ oxidation represented a large part of the total oxygen requirements of the system, adding this large excess of oxygen simplified the combustion of the carbon. Additionally, the excess oxygen absorbed some of the heat of combustion of the carbon and kept the combustion temperature in the annulus at safe operating temperature, i.e., the walls surrounding the combustion chamber did not melt. Further, adding all of the oxygen required for the $TiCl_4$ oxidation eliminated the necessity of preheating the oxygen prior to its introduction into the reaction space.

Supplying oxygen in the above-described manner, also served to regulate the temperature in reaction space 62. Thus, it was discovered that the temperature within the combustion chamber 62 could be raised or lowered by feeding more or less oxygen respectively, into the combustion chamber. Heretofore, actual regulation of the reaction zone temperature had proved practically impossible during the run.

When the carbon feed system was on stream, natural gas fed to combustion chamber 64 was stopped, port 68 was sealed, and feeding of $TiCl_4$ commenced. The titanium tetrachloride was first preheated by 100 p.s.i.g. stream and then vaporized in a 3 foot long electrically heated section of a 2 inch nickel pipe. The line from the vaporizer to the reactor was wrapped with heating wire. The $TiCl_4$ entered the reactor via feed tube 58 at a temperature of 320–350° C.

The preheated $TiCl_4$ at a temperature of 320 to 350° F. was fed to the reactor at a rate of 7.91 gram moles per minute, which was equivalent to a production of 1 ton per day of $TiO_2$. Chlorine, at a rate of 2.3 gram moles per minute was fed through tube 60 to provide a shroud around the $TiCl_4$ feed tube.

The rate of carbon fed to the hammer mill varied between 33 and 47 grams per minute. Air was fed to the center of the hammer mill and to the ejector at a rate of 1.0 gram moles per minute and 1 to 1.8 gram moles per minute, respectively. Additional $O_2$ was added via tube 116 to the mixture flowing in the combustion chamber feed tube at a rate of 11 to 13 gram moles per minute. The total gases in the ignitable mixture fed to the combustion chamber varied between 13 and 15.8 gram moles per minute. The gas composition of the ignitable mixture prior to combustion varied between 84.0 and 89.5 mole percent oxygen. The molar ratio of the gases in the ignitabel mixture to $TiCl_4$ feed averaged about 1.82. The density of the carbon in the suspension fed to the combustion chamber varied between 2.4 and 4.3 grams of carbon per cubic foot of gas, measured at 70° F. and 1 atmospheric pressure. The temperature in the combustion chamber during the runs varied between about 2400 and 2590° F., while the temperature in the reaction zone varied between about 1500° F. and 1800° F.

During the run, a pressure of about 1 to 2 inches of water was maintained in the reactor.

Substantially complete reaction occurred, and the hot mixture of $TiO_2$ in the resulting gases was withdrawn from the outlet 80 and sent to recovery. The $TiO_2$ produced had an unmilled tinting strength of 1350.

*Example XXII*

The procedure followed in making this run was the same as used in Example XXI, except that metallic aluminum was added to the ignitable mixture and co-burned with the "Micronex" carbon in combustion chamber 64.

Preheated $TiCl_4$ at a temperature of 315 to 325° F. was fed to the reactor at a rate of 7.91 gram moles per minute, which was equivalent to a production of 1 ton per day of $TiO_2$. Chlorine, at a rate of 2.1 gram moles per minute was fed through tube 60 to provide a shroud around the $TiCl_4$ feed tube.

Metallic aluminum was mixed with the "Micronex" carbon prior to formation of the ignitable mixture. The rate of feed of solids to the hammer mill was 41 to 46 grams per minute. The moisture content of the carbon was 2 percent by weight. Air was fed to the center of the hammer mill and to the ejector at a rate of 1.0 gram mole per minute and 1.0 to 1.8 gram moles per minute, respectively. Oxygen was fed to line 112 and into the mixture at a rate of 12.6 gram moles per minute. The density of the carbon and aluminum in the suspension fed to combustion chamber 64 was 3.5 grams of carbon and 0.5 gram of aluminum per cubic foot measured at 70° F. and atmospheric pressure. The oxygen content of the ignitable mixture prior to combustion was 89 mole percent.

The average temperature in the annulus during the run was about 2500° F., and the average temperature in the reaction chamber was about 1500° F.

Substantially complete reaction occurred, and the hot mixture of $TiO_2$ in the resulting gases was withdrawn from the reactor and sent to recovery. The $TiO_2$ produced had an unmilled tinting strength of 1590 and a rutile of 98 percent. Upon calcination at a temperature of 850° C. for 45 minutes, the tinting strength rose to 1690, and the rutile rose to 98.7 percent.

*Example XXIII*

Example XXI was repeated, except that $AlCl_3$ was added to the $TiCl_4$ prior to introduction of the $TiCl_4$ into the reactor. The $AlCl_3$ as aspirated into the $TiCl_4$ stream after vaporization and prior to preheating. The quantity of $AlCl_3$ added was 1.3 mole percent, based upon the quantity of $TiCl_4$ feed.

The preheated mixture of $TiCl_4$ and $AlCl_3$ was fed to the reactor at a rate sufficient to provide 7.91 gram moles per minute of $TiCl_4$ to the reactor, which was equivalent to a production of 1 ton per day of $TiO_2$. Chlorine, at a rate of 0.5 gram moles per minute was fed through tube 60 to provide a shroud around the $TiCl_4$ feed tube.

The rate of "Micronex" carbon fed to the hammer mill was 46 grams per minute. The moisture content of the carbon was about 2 percent by weight. Air was fed to the center of the hammer mill and to the ejector at a rate of 1.0 gram moles per minute and 1.1 gram moles per minute, respectively. Oxygen was fed to line 112 at a rate of 14.7 gram moles per minute. The density of the carbon in the suspension fed to combustion chamber 64 was 3.1 grams per cubic foot of gas, measured at 70° F. and 1 atmosphere pressure.

The average temperature in the annulus was about 2500° F., and the average temperature in the reaction space was about 1500° F.

Substantially complete reaction occurred, and the hot mixture of $TiO_2$ in the resulting gases was withdrawn from the reactor and sent to recovery. The $TiO_2$ produced had an unmilled tinting strength of 1430 and a rutile of 74.8 percent. When dry milled in a ball mill, it had a tinting strength of 1500. Upon calcination at a temperature of 850° C. for 45 minutes, the tinting strength rose to 1670, and the rutile was 92.2 percent.

*Example XXIV*

Example XXI was repeated, except that chlorine gas was added to reaction space 62. The chlorine stream was added through a port which entered reaction space 62 perpendicularly to the inside wall of the reactor and which was 4 inches downstream from the combustion gas inlet.

Preheated $TiCl_4$ at an average temperature of 325° F. was fed to the reactor at a rate of 7.91 gram moles per minute, which was equivalent to a production of 1 ton per day of $TiO_2$. Chlorine, at an average rate of 1.5 gram moles per minute was fed through tube 60 to provide a shroud around the $TiCl_4$ feed tube. Chlorine was also fed into the reaction zone 4 inches downstream from the entry of the combustion gas into the hollow shaft at a rate of 7 gram moles per minute.

The rate of "Micronex" carbon fed to the hammer mill was 46 grams per minute. The moisture content of the carbon was about 2 percent by weight. Air was fed to the center of the hammer mill and to the ejector at rates of 1.0 gram moles per minute and 1.2 gram moles per minute, respectively. Oxygen was fed to line 112 at an average rate of 13.0 gram moles per minute. The average density of the carbon in the suspension fed to combustion chamber 64 was 3.0 grams per cubic foot, measured at 70° F. and 1 atmosphere pressure.

The average temperature in the annulus was 2450° F., and the average temperature in the reaction zone was 1500° F.

Substantially complete reaction occurred, and the hot mixture of $TiO_2$ in the resulting gases was withdrawn from the reactor and sent to recovery. The $TiO_2$ produced had an unmilled tinting strength of 1430, and a rutile of 74.8 percent. When dry milled in a ball mill, it had a tinting strength of 1500. Upon calcination at a temperature of 850° C. for 45 minutes, the tinting strength rose to above 1600 and the rutile to above 90 percent.

*Example XXV*

Example XXI was repeated, with the exception that additional air was added to the combustion chamber as a separate stream. This additional air was fed to the combustion chamber via tube 74.

Preheated $TiCl_4$ at an average temperature of 325° F. was fed to the reactor at a rate of 7.91 gram moles per minute, which was equivalent to a production of 1 ton per day. Chlorine at an average rate of 2.4 gram moles per minute was fed through tube 60 to provide a shroud around the $TiCl_4$ feed tube.

The average rate of "Micronex" carbon fed to the hammer mill was 69 grams per minute. The moisture content of the carbon was about 2 percent by weight. Air was fed to the center of the hammer mill and to the ejector at rates of 1.0 gram mole per minute and 2.3 gram moles per minute, respectively. Oxygen was fed to line 112 at an average rate of 13.6 gram moles per minute. Additional air was fed to the combustion chamber via tube 74 at a rate of 15.9 gram moles per minute. This additional air entered the combustion chamber tangentially, and flowed co-currently with the ignitible mixture entering the combustion chamber via tube 72. The summation of the gases fed to the combustion chamber was 32.8 gram moles per minute. The molar ratio of gases fed to the combustion chamber to $TiCl_4$ feed was 4.15. The average solid density of the ignitible mixture fed to the combustion chamber in terms of the total gases fed to the combustion chamber was 69 grams of carbon per cubic foot gas measured at 70° F. and 1 atmospheric pressure. The average gas composition of the ignitible mixture prior to combustion was 54 mole percent oxygen.

The average temperature in the combustion chamber was about 2310° F., and the average temperature in the reaction zone was about 1200° F.

Substantially complete reaction occurred, and the hot mixture of $TiO_2$ in the resulting gases was withdrawn from the reactor and sent to recovery. The $TiO_2$ produced had an unmilled tinting strength of 1485 and an average rutile of 63.4 percent. After calcination for 45 minutes at a temperature of 860° C., the tinting strength was 1620, and the rutile 96.6 percent.

Although in Examples XXI to XXV all the oxygen required for the oxidation of $TiCl_4$ is added with the ignitible mixture of solid carbonaceous fuel, it should be understood that the invention is not limited to this type of oxygen feed. Thus, some or all of the oxygen required to react with the $TiCl_4$ may be premixed with the $TiCl_4$ prior to introduction of this stream into the reactor. Additionally, if desired, a separate stream of oxygen may be introduced into the central shaft of the furnace.

It should be understood that operation at atmospheric conditions, or under pressure or vacuum is contemplated in the operation described in the above examples, regardless of the pressure conditions described for the particular runs.

The tinting strengths given in the examples are calculated by the Reynolds constant volume method as reported in American Ink Maker, volume 14, page 21 (1936).

In addition to titanium oxide, the herein described process may be used to produce finely divided oxides of any of the metallic elements in groups 3 and 4 of the periodic system which form volatile chlorides. Such metallic elements include silicon, zirconium, tin, and so forth. In addition to chlorides, other volatile metal halides such as iodides, bromides, and fluorides may be oxidized to white metal oxides by using the herein described process.

The above advantages and many others will be apparent to the skilled chemist or chemical engineer. Not only does the present invention contemplate within its scope modifications within the skill of the art, but the details given hereinabove are not intended to limit the scope of the invention except insofar as limitations appear in the appended claims.

I claim:

1. In the process of producing pigmentary titanium dioxide by vapor phase oxidation of titanium tetrachloride, the improvement which comprises intermixing in a reaction zone at from 1400° F. to 2700° F. separate streams of titanium tetrachloride vapor, essentially free of elemental oxygen, and of a hot mixture of elemental oxygen and products of combustion produced by initiating combustion of a carbonaceous material in the presence of elemental oxygen in a zone separate from said reaction zone, the quantity of oxygen present in said reaction zone being sufficient to convert substantially all of said titanium tetrachloride to titanium dioxide.

2. A method of preparing titanium dioxide which comprises burning a carbonaceous combustible in a stream comprising elemental oxygen and thereby producing a hot stream comprising elemental oxygen and combustion products of said burning, said hot stream having a temperature not substantially below 2310° F., and thereafter feeding titanium tetrachloride vapor having a temperature below 1400° F. to said hot stream in a reaction zone spaced from where the hot stream is produced and thereby reacting oxygen with titanium tetrachloride in said zone, maintaining enough oxygen in said zone sufficient to convert substantially all of the titanium tetrachloride to titanium dioxide, and feeding said oxygen-containing hot stream into said zone fast enough to maintain the temperature of said zone above 1400° F. and high enough to cause said reaction.

3. In the process of producing pigmentary titanium dioxide by vapor phase oxidation of titanium tetrachloride, the improvement which comprises intermixing in a reaction zone maintained at from 1400° F. to 2700° F., separate streams of vaporous titanium tetrachloride, of gaseous chlorine, and of elemental oxygen in admixture with the products formed by the initiation of combustion of a combustible material in a zone separate from said reaction zone, the amount of oxygen present in said reaction zone being sufficient to oxidize substantially all of the titanium tetrachloride present to titanium dioxide, and recovering pigmentary titanium dioxide from said reaction zone.

4. In the process of effecting vapor phase oxidation of titanium tetrachloride to produce particulate titanium oxide, the improvement which comprises feeding to a reaction zone maintained at from 1400° F. to 2700° F. a stream of titanium tetrachloride vapor having a temperature below that of the reaction zone and a separate hot stream comprising a mixture of elemental oxygen with products of combustion, said separate stream having a temperature not substantially below 2310° F., said combustion products having been produced by initiating combustion of a combustible material in the presence of elemental oxygen in a zone separate from said reaction zone, the quantity of oxygen present in said reaction zone being sufficient to convert substantially all of said titanium tetrachloride to titanium oxide, and feeding said hot oxygen-containing stream in sufficient amount to hold the temperature of said reaction zone at the above reaction zone temperature.

5. In the process of effecting vapor phase oxidation of titanium tetrachloride to produce particulate titanium oxide, the improvement which comprises contacting and intermixing in a reaction zone maintained at from 1400° F. to 2700° F., separate streams of titanium tetrachloride vapor and hot elemental oxygen in admixture with products of combustion produced by initiating combustion of a combustible material in the presence of elemental oxygen in a zone separate from said reaction zone, said stream of hot oxygen mixed with said products of combustion having a temperature in excess of the temperature of said reaction zone and said stream of titanium tetrachloride vapor having a temperature below the temperature of said reaction zone, the quantity of oxygen in said reaction zone being sufficient to convert substantially all of said titanium tetrachloride to titanium oxide and feeding said stream of hot elemental oxygen in admixture with said products of combustion in sufficient amount to hold the temperature of said reaction zone at the above reaction zone temperature.

6. The process of claim 5 wherein a stream containing chlorine is introduced between said separate streams prior to contact of said streams in said reaction zone.

7. The process of claim 5 wherein said stream of titanium tetrachloride vapor contains a small quantity of aluminum chloride.

8. In the process of producing pigmentary titanium oxide by vapor phase oxidation of titanium tetrachloride, the improvement which comprises feeding a stream comprising elemental oxygen and a separate stream containing titanium tetrachloride vapor to a reaction zone at from 1400° F. to 2700° F. provided in a reaction chamber, said stream comprising elemental oxygen having admixed therein products of combustion produced by initiating combustion of a combustible material in the presence of oxygen in a combustion chamber outside of said reaction chamber and in open communication therewith, said combustion chamber having a temperature not substantially below 2310° F., and recovering pigmentary titanium oxide from said reaction chamber.

9. In the process of producing pigmentary titanium oxide by vapor phase oxidation of titanium tetrachloride, the improvement which comprises reacting elemental oxygen and combustible material in a combustion chamber, removing the products of said reaction from said combustion chamber, flowing the products of said reaction in admixture with elemental oxygen to a reaction chamber having a reaction zone at from 1400° F. to 2700° F., said combustion chamber being exterior and apart from said reaction chamber, simultaneously feeding to said reaction chamber a separate stream containing titanium tetrachloride vapor having a temperature below the temperature of said reaction zone, the quantity of oxygen present in said reaction zone being sufficient to convert substantially all of said titanium tetrachloride to titanium oxide, and recovering titanium oxide produced in said reaction chamber.

10. In the process of producing pigmentary titanium oxide by vapor phase oxidation of titanium tetrachloride, the improvement which comprises reacting elemental oxygen and combustible material in a combustion chamber having a temperature not substantially below 2310° F., flowing as a stream the products of said combustion having admixed therein elemental oxygen to a reaction chamber maintained apart from said combustion chamber but in open communication therewith, said reaction chamber having a reaction zone at from 1400° F. to 2700° F., simultaneously introducing to said reaction chamber and reaction zone a separate stream containing titanium tetrachloride vapor at a temperature below which said chloride substantially reacts with elemental oxygen to form the corresponding oxide, intermixing and reacting oxygen with said chloride to produce titanium oxide while providing in said reaction zone sufficient oxygen to substantially convert all of said titanium tetrachloride to titanium oxide and providing sufficient of said stream of products of combustion to said reaction chamber to hold the temperature of said reaction zone above 1400° F.

References Cited in the file of this patent

UNITED STATES PATENTS

| | | |
|---|---|---|
| 2,347,496 | Muskat et al. | Apr. 25, 1944 |
| 2,488,439 | Schaumann | Nov. 15, 1949 |
| 2,512,341 | Krchma | June 20, 1950 |
| 2,635,946 | Weber et al. | Apr. 21, 1953 |
| 2,653,078 | Lane | Sept. 22, 1953 |
| 2,689,781 | Schaumann | Sept. 21, 1954 |
| 2,760,846 | Richmond et al. | Aug. 28, 1956 |
| 2,779,662 | Frey | Jan. 29, 1957 |
| 2,823,982 | Saladin et al. | Feb. 18, 1958 |